Sept. 2, 1947.  E. W. CHAFEE  2,426,596
MULTISTATION HEIGHT FINDER
Filed June 7, 1941  5 Sheets-Sheet 1

INVENTOR,
EARL W. CHAFEE,
BY Herbert H. Thompson
HIS ATTORNEY.

Sept. 2, 1947.  E. W. CHAFEE  2,426,596
MULTISTATION HEIGHT FINDER
Filed June 7, 1941  5 Sheets-Sheet 2

INVENTOR,
EARL W. CHAFEE,
BY
Herbert H. Thompson
HIS ATTORNEY.

INVENTOR,
EARL W. CHAFEE,
BY
Herbert H. Thompson
HIS ATTORNEY.

Sept. 2, 1947.					E. W. CHAFEE					2,426,596
MULTISTATION HEIGHT FINDER
Filed June 7, 1941					5 Sheets-Sheet 4

INVENTOR,
EARL W. CHAFEE,
BY
Herbert H. Thompson
HIS ATTORNEY.

Sept. 2, 1947.  E. W. CHAFEE  2,426,596
MULTISTATION HEIGHT FINDER
Filed June 7, 1941  5 Sheets—Sheet 5

FIG_10_

FIG_11_

INVENTOR
EARL W. CHAFEE
BY Herbert H. Thompson
HIS ATTORNEY

Patented Sept. 2, 1947

2,426,596

UNITED STATES PATENT OFFICE 2,426,596

MULTISTATION HEIGHT FINDER

Earl W. Chafee, New York, N. Y., assignor to Sperry Gyroscope Company, Inc., Brooklyn, N. Y., a corporation of New York Application June 7, 1941, Serial No. 396,983

20 Claims. (Cl. 235—61.5)

1

This invention relates to improvements in altimeters or height finders of the multi-station or long base type. According to my invention, I make use of the "altimetric roof" principle in the determination of altitude, which "per se" is known in the art.

One object of the invention is to produce a continuous solution for altitude in an instrument of this type so that as the target is followed at either or both stations, the altitude is continuously given in a form suitable for feeding into an anti-aircraft predictor continuously.

Another object of the invention is to so design the apparatus that the two stations may be at a different altitude without affecting the accuracy of the device or the continuous flow of data.

Another object of the invention is to so design the device that it may be used with stations of different distances between them or in different directions, and also so that the device may be used on both sides of the zenith or, in other words, where the sighting angles are either acute or obtuse.

A further object of the invention is to provide a means for showing when the device is inoperative and also for showing the proper dials to read when the sighting angles are obtuse and acute.

Referring to the drawings showing one form my invention may assume.

Figures 2, 3:
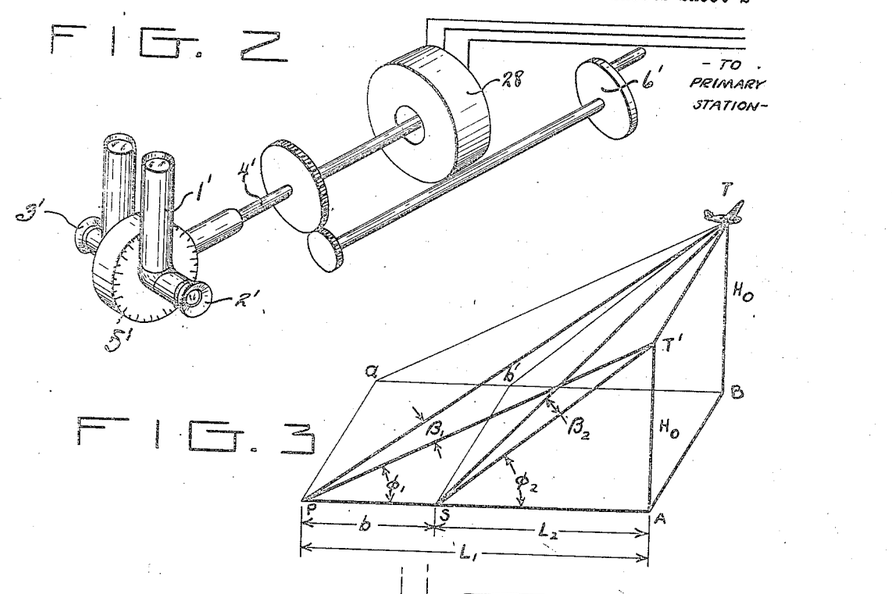
Fig. 2 is a similar diagram of the sight and connected transmitter at station S.
Fig. 3 is a diagram showing the trigonometric principles involved.

Referring first to Fig. 3, it is assumed that station P and station S are at a distance apart $b$. $PaBA$ is a horizontal plane containing $b$, and $PT'A$ is a vertical plane also containing $b$. $TT'BA$ is a vertical plane perpendicular to the two other planes and containing the target T. The sighting angles $\phi_1$ and $\phi_2$ determine the slant planes $PaTT'$ and $Sb'TT'$ which intersect on the horizontal line $TT'$, which line is known as the peak of the altimetric roof. All points in the line $TT'$ have the same altitude, i. e., $T'A=TB=H_0$ (the unknown altitude). A consideration of this figure will show that the unknown altitude $H_0$ is the common altitude of the two triangles $PAT'$ and $SAT'$, of which the angles $\phi_1$ and $\phi_2$ are both known. The distance between the two stations P and S ($b$) is also known. By my invention, I provide a mechanical means for continuously solving for the unknown altitude of a moving target by simple trigonometrical functions. Thus, the following equations may be written:

$$L_1 = L_2 + b$$
$$L_1 = H_0 \cot \phi_1$$
$$L_2 = H_0 \cot \phi_2 \quad \text{(Equation 1)}$$
$$\therefore H_0 \cot \phi_1 = H_0 \cot \phi_2 + b$$

or these functions may be set up as tangent functions as shown hereinafter.

The above equations hold good whether the target is to the right of the stations P and S, where the angles $\phi_1$ and $\phi_2$ are acute, or to the left of the stations P and S, where such angles are both obtuse, provided distances measured to the right are considered, say, positive and distances measured to the left are considered of opposite sign. In case, however, the target is almost directly overhead, that is, lies between the points P and S, the solution proposed by the present invention becomes indeterminate. In such case, it may readily be seen that one of the angles $\phi_1$ or $\phi_2$ is acute and the other obtuse. In all cases, however, $\phi_2 > \phi_1$.

Figure 4:
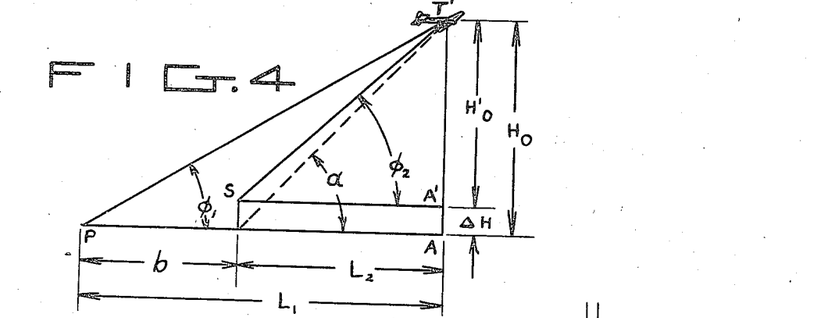
Fig. 4 is a further diagram showing the effect of differences in altitude of the two sighting stations.

Even if the two stations P and S are not at the same altitude, the same general solution applies, as indicated in Fig. 4. In this figure, the difference in altitude of the stations P and S is shown as $\Delta H$ and therefore, in this case the above Equation 1 becomes $$H_0 \cot \phi_1 = (H_0 - \Delta H) \cot \phi_2 + b$$
(Equation 2)

At sighting station P is shown the sight 1 (Figs. 1 and 7) rotatably mounted in elevation ($\phi_1$) and in the slant plane determined by $\phi_1$. Said sight may be provided with double eye pieces 2 and 3, either one of which may be used, depending upon which one is in the best position to look through as the sight is revolved in elevation. Freedom in elevation is provided by mounting the sight for rotation about the horizontal axis of shaft 4 to give the angle $\phi_1$, and it may be turned about an axis perpendicular thereto, in other words, about the axis of the eye pieces to give the angle $\beta_1$. Rotation about the latter axis may be done directly by moving the sights by hand, the angle $\beta_1$ being shown on scale 5. Movement in elevation through the angle $\phi_1$, however, is shown as obtained by rotating the handwheel 6 which turns, through a pinion 7 and gear 8, a second shaft 9 on which is mounted the sight angle scale 10 and a long pinion 11. Gear 8 is shown as driving a larger gear 12 on shaft 4 so that rotation of the gear 12 rotates the sights in elevation. The rotation of the long pinion 11 turns, through meshing gear 13, a three-dimensional cam 14 laid out circumferentially in a cotangent function of the angle $\phi_1$ and longitudinally in a function of $H_0$.

Said cam is positioned longitudinally from the $H_0$ handwheel 15 on a threaded shaft 16 threaded in an adjustable carriage 17 within which is mounted the fixed shaft 18 on which cam 14 is journaled. Therefore, by rotating handwheel 15, the cam is moved longitudinally and each successive transverse section is increased with $fH_0$. Cam 14' for station S is similarly designed.

On cam 14 is a lift pin 19 having rack teeth 20 thereon which mesh with the pinion 21 on shaft 22. The lift of said pin therefore is proportional to $H_0 \cot \phi_1$ or, in other words, to $L_1$. Rotation of said shaft 22 turns, through a second pinion 23 and gear 24, an annular scale and reference index 25 which may be graduated in feet or other unit of distance, and the position of which with reference to a stationary index 26 represents the unknown distance $L_1$ of Fig. 3.

Figure 1:
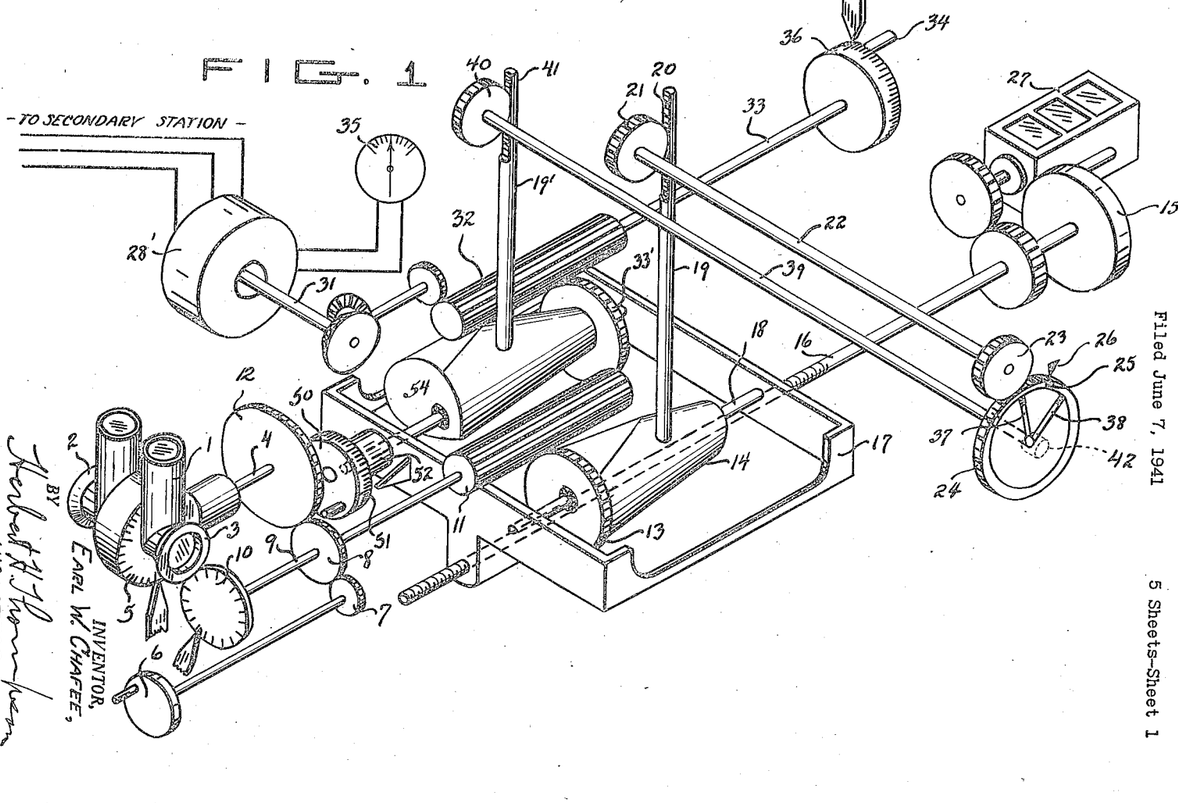
Fig. 1 is a diagram in perspective, showing the principal portions of the computing mechanism at station P.
Figure 5:
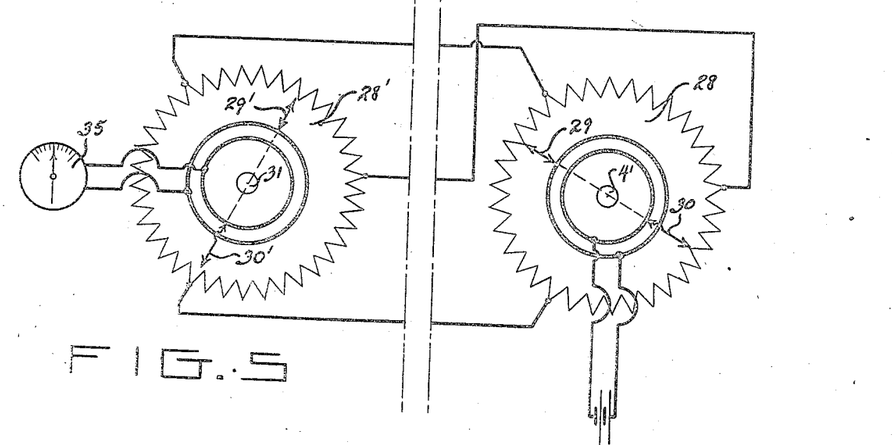
Fig. 5 is a wiring diagram of the electrical transmission system employed between the two stations.

Similarly, the cam 14' for station S is rotated through the angle $\phi_2$. This may be conveniently effected by some form of electrical transmission system such as a potentometer 28 on the horizontal shaft 4' of the sight 1' at station S, said sight being rotated from the handwheel 6'. Potentiometer 28 (Fig. 5) is shown as a circular resistance having three equipositioned taps connected similarly to a second potentiometer 28' of similar form at the primary station. Each potentiometer has rotatable sliding brushes 29, 30 and 29', 30', the former brushes being shown as mounted on the shaft 4'. The potentiometer 28', on the other hand, is shown as mounted on a shaft 31 rotated through suitable gearing from the long pinion 32 on the shaft 33 of the handwheel 34. The operator of the handwheel 34 rotates the same until the potentiometer 28' is in the same relative position as potentiometer 28 or, in other words, until the milliammeter 35 connected to the latter reads zero (Figs. 1 and 5).

By this means I have provided a simple transmission system between the two station P and S, but it is obvious that other types of transmission systems could be substituted, using either full power control or manual supplemental power, as desired.

The scale 36 on shaft 33 therefore shows the angle $\phi_2$ and positions the cam 14', which is geared to the pinion 32, through the angle $\phi_2$. Cam 14', like cam 14, is journaled in the carriage 17 so that it is likewise adjusted from the $H_0$ handwheel 15. The lift of the pin 19' thereon therefore represents $L_2$ of the diagram and is shown as positioning the two pointers 37 and 38 readable with reference to the index 25, and both of which are connected to rotate with the shaft 39 of the pinion 40 meshing with the rack teeth 41 on the pin 19'. From the equations and from the diagram of Fig. 3 it will be seen that $L_1 = L_2 + b$. Therefore the pointers 37 and 38 are initially set apart by knob 42 through a distance on the scale 43 equal to $2b$. In other words, one pointer is set through the distance $b$ in one direction from the mutual zero and the other pointer through the distance $b$ from zero in the other direction to take care of the reversal in sign as the sights pass through the zenith.

For this purpose, the pointer 37 is shown as secured to the face of a gear 70 secured to a sleeve rotatably mounted on shaft 42' of knob 42. Pointer 38 is similarly secured to the face of a similarly mounted gear 71. On the inner end of knob 42 is shown a pinion 72 meshing with a gear 73 on the shaft of the elongated pinion 60 which meshes both with the gear 71 and a second elongated pinion 61, the latter meshing with the aforesaid gear 70. When knob 42 is rotated, therefore, the pointers 37 and 38 are either spread apart or brought together, at all times maintaining the distance $b$ between the zero index and each pointer, as shown on scale 43. It will also be seen that since the entire gear train connected with the pointers is supported by the framework 74 which is secured to and rotates with the shaft 39, the two pointers will be moved together through the same angle as turned by the shaft 39.

The operator of the handwheel 15 then rotates the same until the index 25 coincides with the selected pointer 37 or 38, these pointers being of distinctive colors, say red and white, one of the pointers being used when both angles $\phi_1$ and $\phi_2$ are acute and the other when both angles are obtuse. In order to show automatically which pointer to use, I have shown in Fig. 6 a cam 44 connected to rotate with the sight 1 and adapted to close spring contacts 45 when the sighting angle of the sight 1 is acute and thereby light the white signal lamp 46, which shows that the white pointer 37 should be matched with the index 25. Similarly, I provide a cam 44' to be rotated from the sight S or the equivalent handwheel 34, which is designed so as to be opened when the sighting angle is acute and closed when it is obtuse. Therefore the white light 46 is lighted and the red light 46' extinguished when the angles are acute, and the red light 46' lighted and the white light 46 extinguished when the angles are obtuse. On the other hand, when one angle is acute and the other is obtuse, both lights are either off or on, in which case the observer continues to crank in the original direction of movement until one of the lamps lights up.

A consideration of Equation 1 will show that when the operator turns the crank 15 to match index 25 with one of the selected pointers 37 or 38, the operator is really inserting the unknown $H_0$ into this equation, so that the angular distance that the handle is rotated is a measure of the altitude $H_0$. This may therefore be read on the indicator 27 geared thereto.

Figures 6, 7:
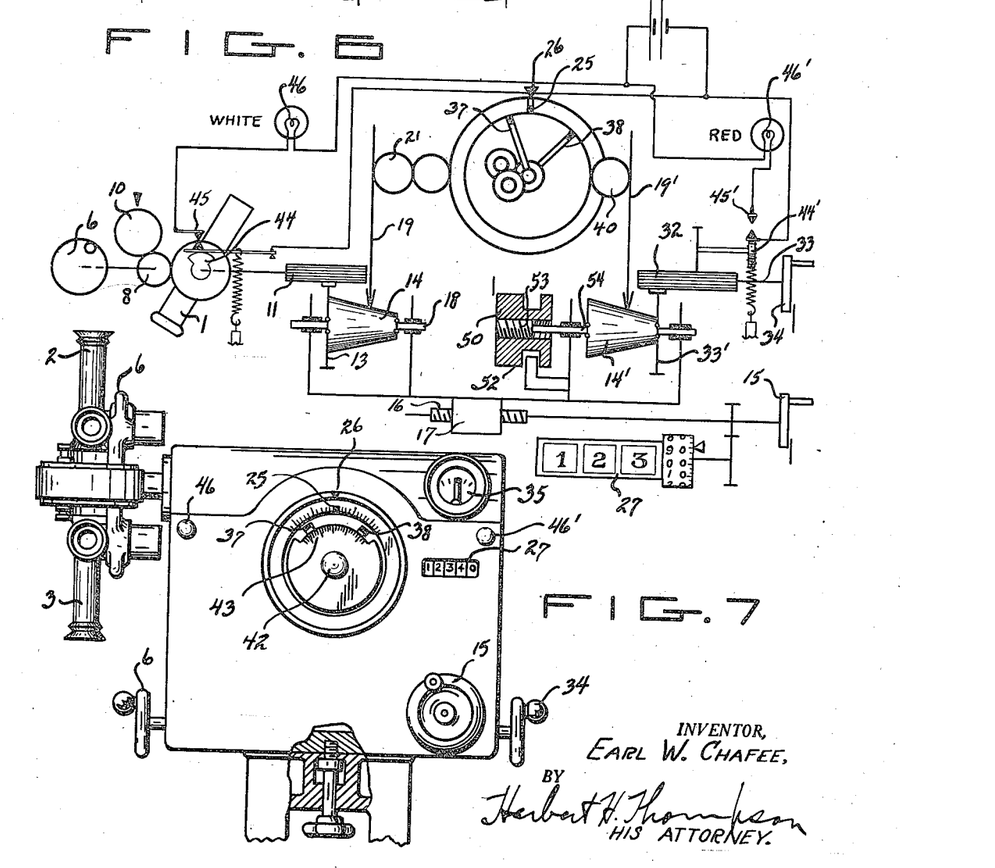
Fig. 6 is a plan diagram, in simplified form, of the mechanism shown in Fig. 1.
Fig. 7 is a front elevation of the computing device at sighting station P.

In order to provide for difference in elevation between the stations, i. e., $\Delta H$, I have shown in Figs. 1 and 6 a fourth handwheel 50 provided with a graduated dial 51 and having an interiorly threaded hub 52 in which is threaded a sleeve 53 rotatably but non-slidably mounted on the shaft 54 of the cam 14'. Therefore, by adjusting the handwheel, the cam 14' may be adjusted longitudinally independently of the cam 14, although it is moved bodily with the carriage 17 and cam 14 when handwheel 15 is adjusted. By this means, the difference in altitude ($\Delta H$) between the stations may be inserted on the cam 14', and it will readily be seen, therefore, that in this case Equation 2 is solved by the turning of crank 15 to match the index 25 and the selected pointer 37 or 38. The altitude thus determined may be read on indicator 27 and is continuously set in the computer or predictor by hand or automatically, as desired.

From the foregoing, some of the advantages of my invention will be apparent. Thus, with my system of continuous flow of data and movement of the follow-the-pointer dials (Figs. 8 and 9), the operator may so operate the handwheels as to average out unevenness in the angular positions of $\phi_1$ and $\phi_2$ as they come in.

Figure 8:
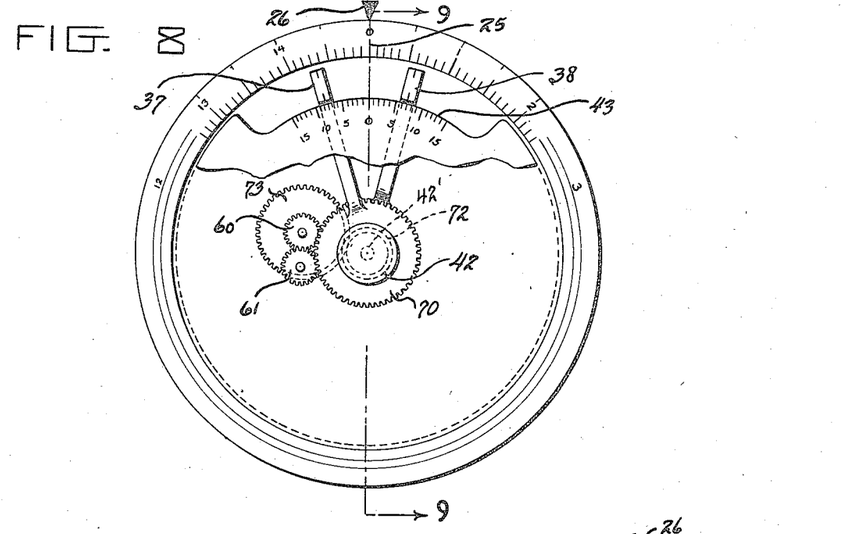
Fig. 8 is a face view on a larger scale of the base line pointer dial.
Figure 9:
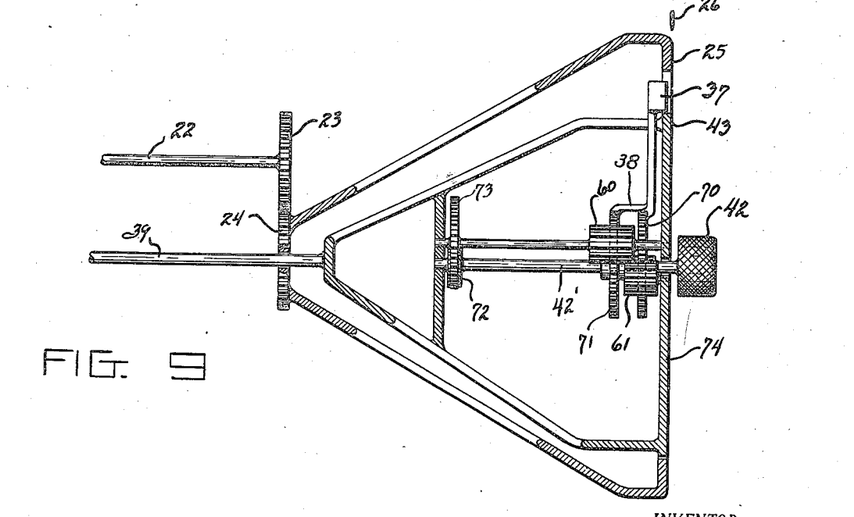
Fig. 9 is a vertical section of the same on line 9—9 of Fig. 8.
Figures 10, 11:
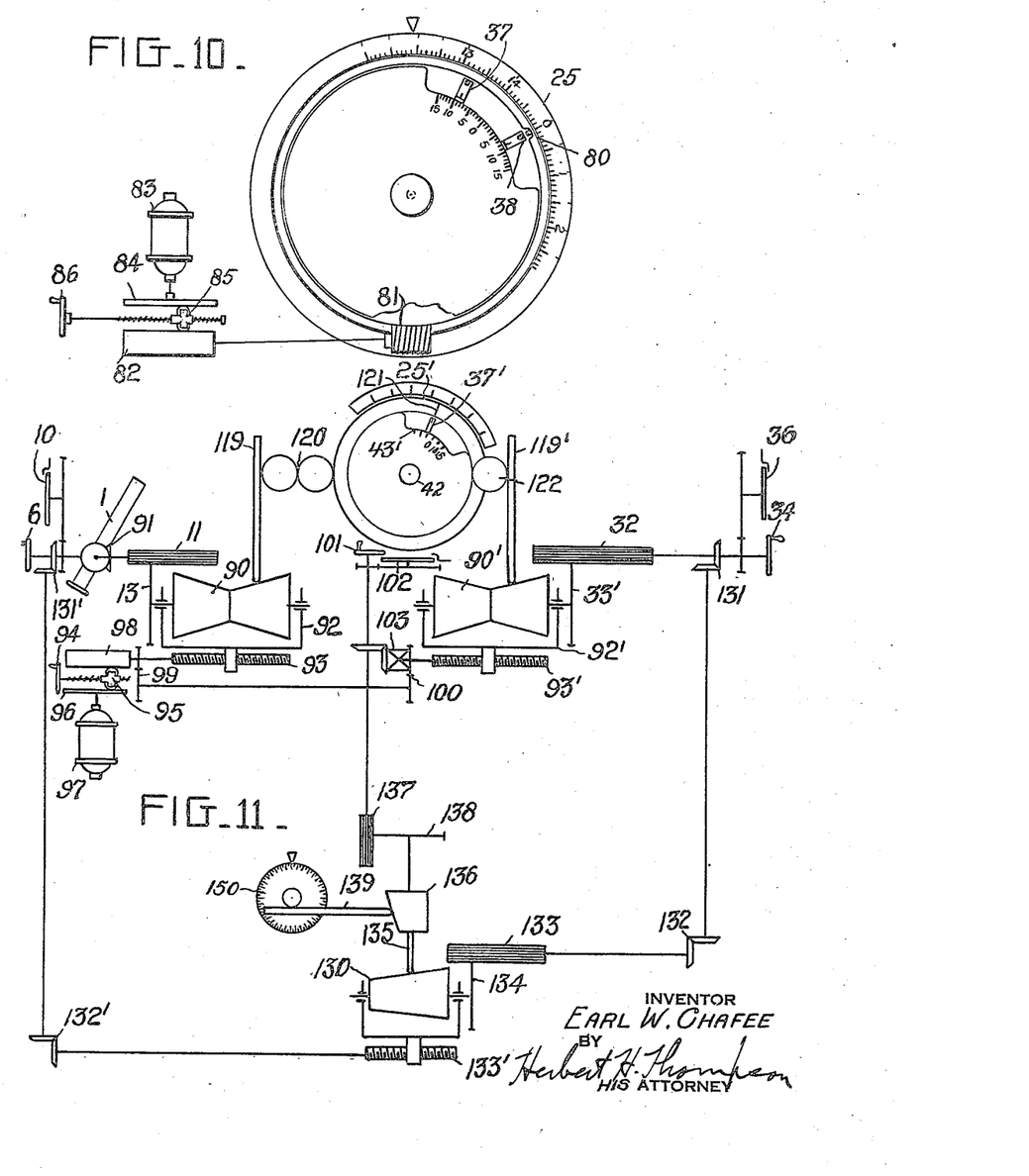
Fig. 10 is a face view of a modified form of dial shown in Figs. 8 and 9, the variable speed drives being shown in diagrammatic form.
Fig. 11 is a diagrammatic view of a modified form of the invention.

This idea is further developed in Fig. 10, showing a modified form of the indicating mechanism shown in Fig. 8. According to this system, there is interposed between the outer rotating dial 25 and the inner pointers 37 and 38 an intermediate index 80. This index is independently rotatable and is shown as being driven from a worm 81 on the shaft of the cylinder 82 of a variable speed drive comprising a constant speed motor 83, a disc 84 driven therefrom, and a radially adjustable ball carriage 85 which may be set from handwheel 86 so that the cylinder 82 is driven at any desired speed in either direction. In operating the same, the handwheel 86 is adjusted until the index 80 follows either or both of the follow-the-pointers 25 and 37 or 38, so that a rate change of range is thereby set up. The mechanism will therefore continue to operate even if the target is obscured from one of the sighting stations, since in that case the index 80 will continue to follow the pointer of the sighting station which remains on the target. Thereby the apparatus will continue to function during a considerable period even though one station may be obscured or put out of action.

It is, of course, obvious that the several variables involved may be introduced in a different manner than described in the modification shown in Figs. 1 and 6. Thus in Fig. 11, I have shown one of the many variations of which my invention is capable. In this figure, two three-dimensional camps are again employed, the rotation of one being governed by $\phi_1$ and the rotation of the other by $\phi_2$. In this case, however, the cams are axially displaced in accordance with $L_1$ and $L_1 - b$, respectively, the cams being laid out in a tangent function of $\phi_1$ and $\phi_2$, so that the lift of the two pins are each proportional to $H_0$. Therefore, the cams in this case simultaneously solve the equations (each involving two unknowns)

$$H_0 = L_1 \tan \phi_1$$

and $$H_0 = (L_1 - b) \tan \phi_2$$

In this figure, the sight at station P is again shown at 1 and the rotation of the sight rotates the three-dimensional cam 90 through bevel gears 91, long pinion 11 and gear 13. In this case, the carriage or bracket 92 rotatably supporting the cam is displaced longitudinally from a threaded shaft 93 which is rotated by a variable speed drive interposed between the handwheel 94 and the worm 93 so that a rate of change of horizontal range or $L_1$ may be set up. For this purpose, the handwheel 94 is shown as radially positioning the ball carriage 95 over a disc 96 rotatable from constant speed motor 97 to drive the cylinder 98 at a predetermined variable speed and thus rotate the worm shaft 93 on the shaft thereof. Said drive is shown as also rotating through gears 99 and 100 and differential 103, a second worm shaft 93' which axially positions the carriage 92' of the second three-dimensional cam 90'. In this case, $b$ is introduced by positioning the dial 102 from handwheel 101 in accordance with $b$, which rotates the second arm of differential 103 so that the worm shaft 93' is positioned in accordance with $L_1 - b$ (i e. $L_2$).

Cam 90' is rotated in accordance with the angular position of the sight at station S by any suitable means, such as the handwheel 34 mounted on the shaft of the long pinion 32 which meshes with the gear 33' on the shaft of the cam 90'. Handwheel 34, as in the previous form, may be rotated through the proper angle $\phi_2$ which is indicated on the dial 36. In this case, the two cams are laid out in the tangent functions of the angles so that the lift of each pin is proportional to $H_0$. One pin 119 is shown as rotating, through pinions 120, a dial having an index pointer 121 and the other pin 119' rotates the inner dial 43' through pinion 122. The intermediate index pointer 37' normally moves with the dial 43', as in Fig. 8, but may be adjusted with respect thereto by a knob 42 which actuates a mechanism similar to that operated by knob 42 of Figs. 8 and 9 in accordance with the distance representing $\Delta H$, i. e., the difference in elevation between the two sighting stations (see Fig. 4). Therefore, when index pointers 121 and 37' are matched, $H_0$ will be indicated on the outer stationary dial 25' by the aligned indexes.

As in the previous form of the invention, the solution proposed becomes difficult of mechanical solution for angles approaching 90°, in which the tangent functions become too large for mechanical reproduction. To take care of such angles, I propose an additional mechanism as shown at the bottom of Fig. 11. In this figure a single three-dimensional cam 130 is provided which is shown as rotated in accordance with $\phi_2$ from the handwheel 34 through bevel gears 131 and 132, long pinion 133 and gear 134. The cam is shown as positioned longitudinally from $\phi_1$ through bevel gears 131' and 132' and threaded shaft 133'. The cam is laid out so that the lift of the pin 135 thereon represents cot $\phi_1 -$ cot $\phi_2$, said pin axially positioning a second three-dimensional cam 136. The latter cam is shown as rotated from the $b$ handwheel 101 through a pinion 137 and gear 138. The cam 136 may be so laid out, therefore, that the lift of the pin 139 thereon is proportional to $$\frac{b}{\cot \phi_1 - \cot \phi_2}$$

which, it will be seen, is a solution for $H_0$ in Equation 1 and may be indicated on dial 150. Thus, over a considerable range two indications of the same quantity arrived at by different computing means are exhibited, of which the better, for a given condition, may be selected.

In all forms of the invention, a continuous flow of data occurs and a continuous simultaneous solution, so that there is substantially no lag and any change in one variable produces substantially instantaneous change in the value of $H_0$ indicated on the machine.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a two station system for determining the altitude of an aerial object having a device at each station for determining elevation angles of said object, a calculating mechanism comprising a pair of relatively movable indicators adapted to be matched, means for relatively setting said indicators according to the distance between the stations, a device for positioning one of said indicators in accordance with a cotangent function of one of said angles and altitude, a device for positioning the other of said indicators in accordance with a cotangent function of the other of said angles and altitude, and means for actuating both of said devices in accordance with altitude to match said indicators.

2. In a two station system for determining the altitude of an aerial object having a device at each station for determining elevation angles of said object, a calculating mechanism for equating functions of said elevation angles comprising a pair of relatively movable indicators adapted to be matched, means for adjusting the relative positions of said indicators in accordance with the horizontal distance between said stations, a device for positioning one of said indicators in accordance with the cotangent function of one of said angles and altitude, a device for positioning the other of said indicators in accordance with a cotangent function of the other of said angles and altitude, and means for actuating both of said devices in accordance with altitude to match said indicators.

3. In a two station system for determining the altitude of an aerial object having a device at each station for determining elevation angles of said object, a calculating mechanism for equating functions of said elevation angles comprising a pair of relatively movable indicators adapted to be matched, a device for positioning one of said indicators in accordance with a cotangent function of one of said angles and altitude, a device for positioning the other of said indicators in accordance with the cotangent function of the other of said angles and altitude, means for actuating both of said devices in accordance with altitude to match said indicators, and means for adjusting one of said devices in accordance with the vertical distance between said stations.

4. A computing device for determining the altitude of an aerial target for use in connection with a two station observation system wherein each station is provided with a sighting device movable to measure the elevational angle of a target together with means for actuating the computing device in proportion to the degree of movement of the respective sighting devices, the improvement which comprises a pair of cams in said computing device, each adapted to be turned on its axis in accordance with the angle of elevation of the target from the respective stations, a lift pin for each cam, said cams being laid out circumferentially so as to move the associated lift pin in accordance with a cotangent function of the angle at which the associated sighting device is moved and longitudinally in accordance with the height of the target, an indicating scale having a rotary index controlled by the movement of one of said lift pins, a cooperating pointer coaxially disposed in respect to said index adapted to be turned by the movement of the other lift pin, and common movable means for translating the cams, the movement of the common means required to match the pointer with the scale being proportional to the height of the target.

5. In a computing device for determining the altitude of an aerial target for use in connection with a two station observation system wherein each station is provided with a sighting device movable to measure the elevational angle of a target, the improvement which comprises a pair of three dimensional cams in said computing device adapted to be turned in accordance with the elevation angle of the target from the respective stations, a lift pin for each cam, said cams being laid out circumferentially so as to move the associated lift pin in accordance with a cotangent function of the angle at which the associated sighting device is moved, said cams being also laid out longitudinally in a function of the altitude of the target, an indicating scale having a rotary index controlled by the movement of one of said lift pins and cooperating pointer means coaxially disposed in respect to said index adapted to be turned by the other lift pin, means for moving said cams in an axial direction to match said index and pointer, and an indicating device operated by the last mentioned means from which the altitude may be read when the index and pointer are matched.

6. A computing device according to claim 5 in which said cams are mounted in a carriage, and in which means are provided for moving said carriage to impart uniform axial movement to said cams.

7. A computing device according to claim 5 in which said cams are mounted in a carriage, and in which the means for moving the cams comprise a threaded shaft having a crank thereon connected to the carriage, and in which the indicating device from which altitude may be read comprises a revolution counter driven from the last mentioned shaft.

8. A computing device according to claim 5 in which said pointer means comprise a pair of coaxially disposed pointers having adjusting means by which the angular distance between the pointers may be adjusted in proportion to the distance between the two observation stations.

9. A computing device according to claim 5 in which the computing mechanism is disposed at one of said stations, the sighting device thereat being connected to one of the cams by a gear train.

10. A computing device according to claim 5 in which the computing mechanism is disposed at one of the stations and the angular movement of the sighting device at the other station is transmitted to the computing device over electric circuit means.

11. A computing device according to claim 5 in which said cams are mounted in a carriage, and in which means are provided for moving said carriage to impart a uniform axial movement to said cams, and in which means are provided to produce relative axial movement of the cams in the carriage to compensate for height difference between the stations.

12. A computing device for determining the altitude of an aerial target for use in connection with two spaced sighting stations and operating on the altimetric roof principle, said computing device comprising a pair of three dimension cams associated with the respective stations, a support in which said cams are movable in rotary as well as axial directions, a lift pin for each cam responsive to the movement thereof, means in said computing device to move said cams independently in one of said directions in proportion to the elevational angles of a target as determined by the respective sighting stations, the cams being laid out in the latter dimension in accordance with a cotangent function and in accordance with altitude in the other dimension, common means for moving said cams in the other of said directions, cooperating indicator members actuated by the resulting movement of said lift pins, and means for offsetting one indicator member proportionally to the distance between the sighting stations, whereby the height of the target is indicated when said common means is moved to cause the indicator members to match.

13. A computing device for determining the altitude of an aerial target for use in connection with a pair of spaced sighting stations and operating on the altimetric roof principle, said computing device comprising a pair of cams associated with the respective stations, a lift pin for each cam, a support in which said cams are movable in rotary as well as axial directions, said cams being laid out in one dimension in accordance with a cotangent function of the angular position of the sighting device associated therewith, and in another dimension in a function of the altitude of the target, means in said computing device for moving said cams respectively in one of said directions so that the lift pins are displaced in accordance with a cotangent function of the elevational angle of the target as determined by the respective sighting stations, common means for moving the cams in the other of said directions, cooperating indicator members actuated by the resulting movement of said lift pins, and means for offsetting one indicator member proportionally to the distance between the sighting stations, whereby the height of the target is indicated when the common means is moved to cause the indicator members to match.

14. In a computer for determining the altitude of an aerial object, a pair of three dimension cams, separate means for displacing the cams in one dimension according to elevation angle data of the object obtained from individual spaced sighting stations, a lift pin for each cam, a pair of cooperating index members, each member being displaced by one of the lift pins, means for relatively positioning the cams in another dimension in accordance with the space between the sighting stations, common means for further displacing the cams in the last-mentioned dimension to cause the index members to match, the cams being so laid out that the displacement thereof by the common means required to match the index members is proportional to the altitude of the object.

15. In a computer for determining the altitude of an aerial target, a pair of three dimension cams, separate means for displacing the cams in one dimension in accordance with the angles of elevation of the target obtained from separate observation positions, common displaceable means for adjusting the cams in another dimension, means for further adjusting one of the cams in the last-mentioned dimension in accordance with the distance between the observation positions, indicating means controlled by the cams adapted to be matched through the displacement thereof by the common means, the cams being so laid out that the displacement of the common means required to match the indicating means is in proportion to the altitude of the target.

16. In a computer for determining the altitude of an aerial object, a pair of three dimension cams, separate means for displacing the respective cams in one dimension according to elevation angle data of the object obtained from two spaced sighting stations, a height indicating device, common means for adjusting the cams in another dimension together with the height indicating device, a lift pin for each cam, a pair of cooperating index members each displaced by one of the lift pins, setting means for offsetting one index member with respect to the associated lift pin in accordance with the distance between the sighting stations, the cams being so laid out that when adjusted by the common means to cause the indexes to match, the indicating device will indicate the height of the object due to the resulting adjustment thereof.

17. In a computer for determining the altitude of an aerial object, a pair of three dimension cams, a common movable frame within which the cams are supported for rotation, means for respectively displacing each cam in rotation according to elevation angle data of the object determined by individual spaced sighting stations, means for moving the frame to translate the cams, a lift pin for each cam, cooperating indicators respectively actuated by the lift pins, means for offsetting one indicator with respect to the associated lift pin in proportion to the distance between the stations, the cams being so laid out that the displacement of the frame necessary to match the indicators is proportional to the altitude of the object.

18. In a computer for determining the altitude of an aerial object, a pair of three dimension cams, a common movable frame within which the cams are supported for rotation, means for displacing each cam in rotation respectively according to elevation angle data of the object determined by individual spaced sighting stations, a height indicating device, common means effective to move the frame to translate the cams and to simultaneously operate the height indicating device to effect a corresponding change in the height value indicated thereby, a lift pin for each cam, a pair of cooperating index members each displaced by one of the lift pins, one of the index members being offset from the associated lift pin in accordance with the space between the sighting stations, the cams being so laid out that when the frame is adjusted by the common means to cause the indexes to match, the resulting operation of the height indicating device will provide an indication of the height of the object.

19. A computer for determining the altitude of an aerial object according to claim 18, having further means for axially adjusting one of the cams within the frame to compensate for difference in elevation of the sighting stations.

20. In a computer for determining the altitude of an aerial object, a pair of three dimensional cams, separate means for displacing the cams respectively in one dimension according to elevation angle data of the object obtained from two spaced sighting stations, a height indicating device, common means for displacing both cams in another dimension together with the height indicating device, a lift pin for each cam, a pair of cooperating index members each displaced by one of the lift pins, setting means for offsetting one index with respect to the associated lift pin in accordance with the distance between the sighting stations, the cams being so laid out that when so displaced by the common means as to match the indexes, the height indicating means indicates the altitude of the object.

EARL W. CHAFEE.

REFERENCES CITED

The following references are of record in the file of this patent:

UNITED STATES PATENTS

| Number | Name | Date |
|---|---|---|
| 1,408,504 | Hammond et al. | Mar. 7, 1922 |
| 1,345,706 | Routin | July 6, 1920 |
| 1,345,701 | Routin | July 6, 1920 |
| 1,453,104 | Gray | Apr. 24, 1923 |
| 1,751,649 | Nieman | Mar. 25, 1930 |
| 722,435 | Sorensen | Mar. 10, 1903 |
| 2,294,417 | Morrison | Sept. 1, 1942 |
| 1,345,697 | Routin | July 6, 1920 |

FOREIGN PATENTS

| Number | Country | Date |
|---|---|---|
| 332,132 | Germany | Jan. 25, 1921 |

OTHER REFERENCES

Coast Artillery Field Manual (1933), Supt. of Documents, Washington, D. C.